(12) United States Patent
Shankar et al.

(10) Patent No.: US 7,539,185 B2
(45) Date of Patent: May 26, 2009

(54) FAST-PATH IMPLEMENTATION FOR AN UPLINK DOUBLE TAGGING ENGINE

(75) Inventors: Laxman Shankar, San Jose, CA (US); Shekhar Ambe, San Jose, CA (US); Song-Huo Yu, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1178 days.

(21) Appl. No.: 10/378,937

(22) Filed: Mar. 5, 2003

(65) Prior Publication Data

US 2004/0066781 A1 Apr. 8, 2004

(51) Int. Cl.
*H04L 12/28* (2006.01)
(52) U.S. Cl. .................... 370/389; 370/428
(58) Field of Classification Search ............... 370/94.1, 370/238, 389, 390, 392, 395.1, 395.21, 395.43, 370/395.53, 400, 401, 409, 428
See application file for complete search history.

(56) References Cited

U.S. PATENT DOCUMENTS

| | | | | |
|---|---|---|---|---|
| 5,394,402 A * | 2/1995 | Ross | | 370/402 |
| 5,938,736 A * | 8/1999 | Muller et al. | | 709/243 |
| 5,991,297 A * | 11/1999 | Palnati et al. | | 370/389 |
| 6,041,057 A * | 3/2000 | Stone | | 370/397 |
| 6,085,238 A * | 7/2000 | Yuasa et al. | | 709/223 |
| 6,115,379 A * | 9/2000 | Flanders et al. | | 370/392 |
| 6,181,699 B1 * | 1/2001 | Crinion et al. | | 370/392 |
| 6,219,699 B1 * | 4/2001 | McCloghrie et al. | | 709/221 |
| 6,249,521 B1 | 6/2001 | Kerstein | | |
| 6,553,028 B1 * | 4/2003 | Tang et al. | | 370/389 |
| 6,618,388 B2 * | 9/2003 | Yip et al. | | 370/401 |
| 6,633,565 B1 * | 10/2003 | Bronstein et al. | | 370/392 |
| 6,693,909 B1 * | 2/2004 | Mo et al. | | 370/392 |
| 6,778,547 B1 * | 8/2004 | Merchant | | 370/422 |
| 6,788,681 B1 * | 9/2004 | Hurren et al. | | 370/389 |
| 6,862,280 B1 * | 3/2005 | Bertagna | | 370/392 |
| 6,901,452 B1 * | 5/2005 | Bertagna | | 709/240 |
| 6,937,574 B1 * | 8/2005 | Delaney et al. | | 370/254 |
| 6,965,572 B1 * | 11/2005 | Boodaghians | | 370/249 |

(Continued)

FOREIGN PATENT DOCUMENTS

EP 1045553 10/2000

OTHER PUBLICATIONS

"Requirements for Traffic Engineering Over MPLS"; Network Working Group, Request for Comments, Sep. 1999; see http://www.ietf.org/rcf/rcf2702.txt.

(Continued)

*Primary Examiner*—Chirag G Shah
*Assistant Examiner*—Andrew C Lee

(57) ABSTRACT

A network component for processing a packet can include a buffer configured to receive a packet in an ingress port at a network component, a first identification unit configured to identify a destination address and a network identifier from the packet received at the buffer, and a look-up table configured to be indexed by the destination address and the network identifier identified by the identification unit to obtain an outgoing port bit map. In addition, the network component can include a forwarding unit configured to forward the packet to a destination module and out of an egress port within the network component based on the outgoing port bit map.

37 Claims, 10 Drawing Sheets

U.S. PATENT DOCUMENTS

| | | | |
|---|---|---|---|
| 6,975,627 B1 * | 12/2005 | Parry et al. | 370/389 |
| 7,024,487 B2 * | 4/2006 | Mochizuki et al. | 709/238 |
| 7,072,346 B2 * | 7/2006 | Hama | 370/395.53 |
| 7,082,138 B2 * | 7/2006 | Yik et al. | 370/410 |
| 7,092,389 B2 * | 8/2006 | Chase et al. | 370/389 |
| 7,136,355 B2 * | 11/2006 | Lin et al. | 370/235 |
| 7,154,889 B1 * | 12/2006 | Rekhter et al. | 370/392 |
| 7,180,899 B2 * | 2/2007 | De Silva et al. | 370/395.31 |
| 2002/0003801 A1 * | 1/2002 | Hwa et al. | 370/401 |
| 2002/0097730 A1 * | 7/2002 | Langille et al. | 370/401 |
| 2002/0176450 A1 * | 11/2002 | Kong et al. | 370/539 |
| 2003/0123448 A1 * | 7/2003 | Chang | 370/395.1 |
| 2003/0152075 A1 * | 8/2003 | Hawthorne et al. | 370/389 |
| 2006/0280192 A1 * | 12/2006 | Desanti | 370/409 |

OTHER PUBLICATIONS

"Encapsulation Methods for Transport of Ethernet Frames Over IP and MPLS Networks"; Network Working Group, Internet Draft, Jan. 2003; see http://www.ietf.org/internet-drafts/draft-martini-ethernet-encap-mpls-01.txt.

"Encapsulation Methods for Transport of ATM Cells/Frame Over IP and MPLS Networks"; PWE3 Working Group, Internet Draft, Dec. 2002; see http://www.ietf.org/internet-drafts/draft-martini-atm-encap-mpls-01.txt.

"Encapsulation Methods for Transport of PPP/HDLC Frames Over IP and MPLS Networks"; Network Working Group, Internet Draft, Oct. 2002; see http://www.ietf.org/internet-drafts/draft-martinia-ppp-encap-mpls-00.txt.

Paul Brittain, et al., "MPLS Virtual Private Networks—A review of the implementation options for MPLS VPNs including the ongoing standardization work in the IETF MPLS Working Group", Nov. 2000, pp. 1-31.

* cited by examiner

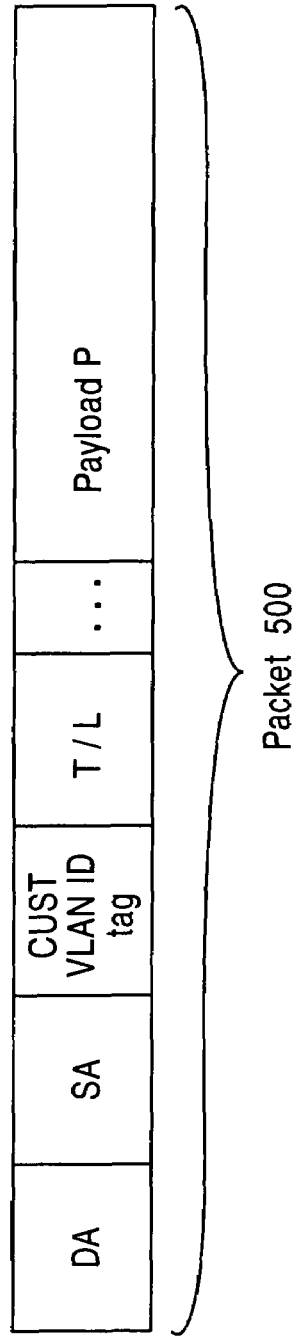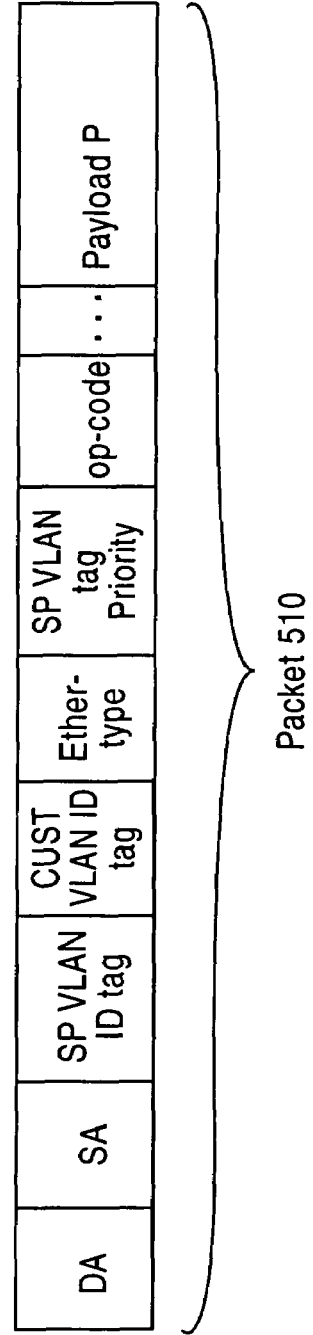

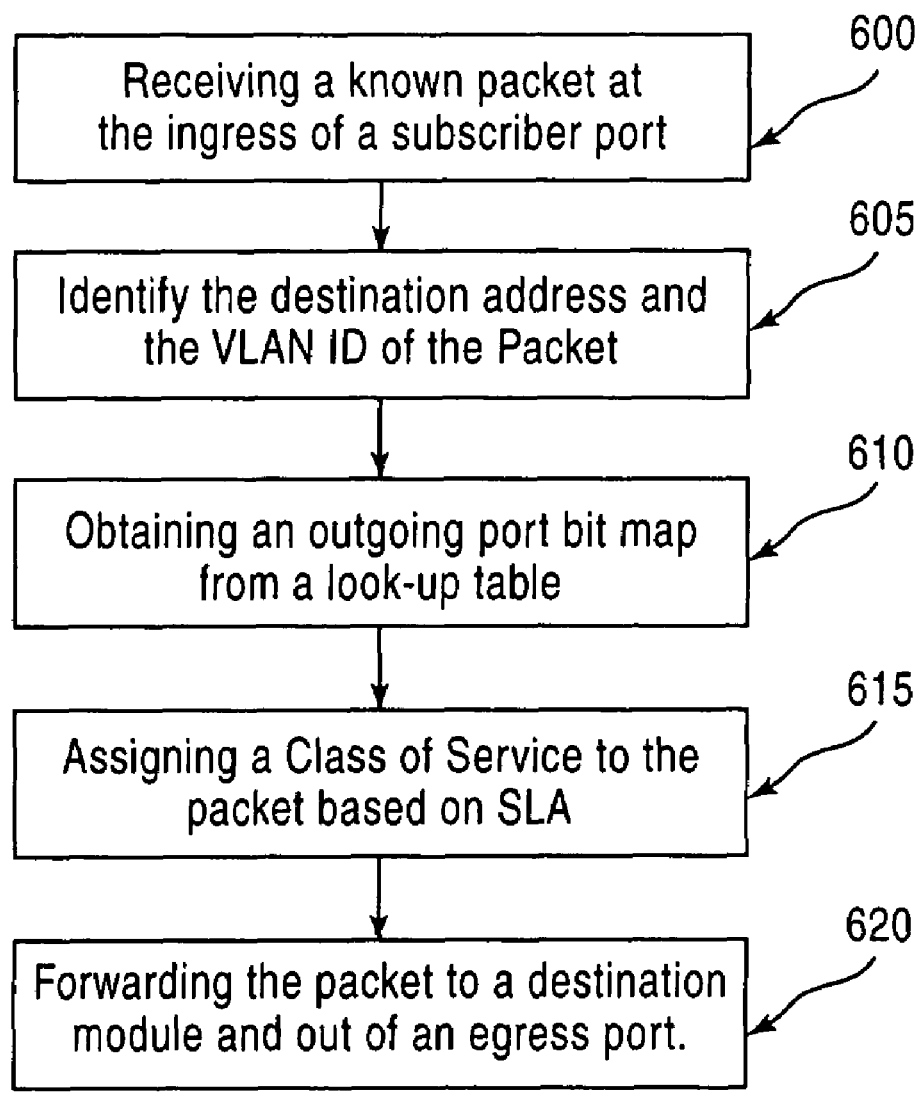

FAST-PATH IMPLEMENTATION FOR AN UPLINK DOUBLE TAGGING ENGINE

BACKGROUND OF THE INVENTION

1. Field of the Invention

The present invention relates to a method of and an apparatus for processing a packet based on a double tagging engine within a Virtual Private LAN Service (VPLS), a Transparent LAN Service (TLS), a Virtual Private Switched Network Service (VPSNS), or any Layer 2 Virtual Private Network (VPN). In essence, the present invention can be applied to any packet-based service provider communication network environment, such as token ring, ATM, Ethernet, Fast Ethernet, Gigabit Ethernet and 10 Gigabit Ethernet. In particular, the present invention relates to a method of and an apparatus for fast-path implementation for TLS using double tagging engine that can be implemented on a semiconductor substrate such as a silicon chip, or can be implemented on software, or a combination of hardware and software.

2. Description of the Related Art

As the popularity and usage of networked computers grows, an increasing amount of end-users are being interconnected via wide area networks and the Internet. In particular, business entities, such as corporations, having multiple site-offices located in different parts of the world, are increasingly relying on the Internet to communicate with each other. For instance, a corporate entity having multiple site-offices located at geographically dispersed sites may look to a fast and efficient way using the Internet to interconnect a group of private site-offices belonging to the private corporate entity together. Accordingly, there is a need to provide a fast, inexpensive and reliable system that can offer a virtual private customer-based network wherein inter-office network connections are achieved using the fast growing Internet infrastructure, especially the Internet Service Provider (ISP).

SUMMARY OF THE INVENTION

One example of the present invention can include a method for processing a packet in a communications network. The method can include the steps of: receiving a packet in an ingress port at a network component, identifying a destination address and a network identifier from the packet, obtaining an outgoing port bit map based on the destination address and the network identifier of the packet, and forwarding the packet to a destination module and out of an egress port within the network component based on the outgoing port bit map.

In another example, the present invention can relate to a method for processing a packet in a communications network. The method can include the steps of receiving a packet in an ingress port at a network component, identifying a network identifier from the packet, accessing a packet tag corresponding to the packet, obtaining an outgoing port bit map based on the network identifier, and obtaining a membership port bit map based on the packet tag. In addition, the method can have the steps of generating an egress port bit map based on the outgoing port bit map and the membership port bit map, and forwarding the packet to a destination module and an egress port within the network component based on the egress port bit map.

In yet another example, the present invention can be a method for processing a packet in a communications network. The method can include the steps of receiving a packet in an ingress port at a network component, identifying a source module and a source port corresponding to the packet, obtaining a packet tag from the packet tag table based on the source module and the source port, assigning a packet tag priority based on a class of service of the packet, and obtaining an ether-type from a register. Furthermore, the steps can include appending the packet received within the buffer with the packet tag, the packet tag priority and the ether-type, and forwarding the packet appended with the packet tag, the packet tag priority and the ether-type to an egress port within the network component.

Another example of the present invention can be a method for processing a packet in a communications network. The method can have the steps of receiving a packet in an ingress port at a network component, removing a packet tag from the packet, obtaining a multicast index and a multicast type from indexing the packet tag to a look-up table, and appending the packet with the multicast index and the multicast type. Also, the method can have the steps of modifying an operational code of the packet to multicast when the multicast type is a first predetermined type, modifying the operation code of the packet to an IP multicast when the multicast type is a second predetermined type, assigning a first class of service for the packet with a packet tag priority, and forwarding the packet to a first egress port.

Another example of the present invention can be a network component for processing a packet. The network component can have a buffer configured to receive a packet in an ingress port at a network component, a first identification unit configured to identify a destination address and a network identifier from the packet received at the buffer, a look-up table configured to be indexed by the destination address and the network identifier identified by the identification unit to obtain an outgoing port bit map, and a forwarding unit configured to forward the packet to a destination module and out of an egress port within the network component based on the outgoing port bit map.

In another example, the present invention can relate to a network component for processing a packet. The network component can have a first buffer configured to receive a packet in an ingress port at a network component, a first identification unit configured to identify a network identifier from the packet received at the buffer, an accessing unit configured to access a packet tag corresponding to the packet received at the buffer, an outgoing port look-up table configured to be indexed by the network identifier identified by the identification unit to obtain an outgoing port bit map, a membership look-up table configured to be indexed by the packet tag accessed by the accessing unit to obtain a membership port bit map, a second buffer configured to store an egress port bit map based on the outgoing port bit map from the outgoing look-up table and the membership port bit map from the membership look-up table, and a forwarding unit configured to forward the packet to a destination module and an egress port within the network component based on the egress port bit map stored at the second buffer.

In yet another example, the present invention can be directed to a network component for processing a packet. The network component can have a buffer configured to receive a packet in an ingress port at a network component, an identifying unit configured to identify a source module and a source port corresponding to the packet received at the buffer, a packet tag look-up table configured to be indexed by the source module and the source port identified by the identifying unit to obtain a packet tag, and an assigning unit configured to assign a packet tag priority based on a class of service of the packet received at the buffer. In addition, the present example can have a register configured to store an ether-type, an appending unit configured to append the packet received at the buffer with the packet tag, the packet tag priority and the ether-type, and a forwarding unit configured to forward the packet appended with the packet tag, the packet tag priority and the ether-type by the appending unit, to an egress port within the network component.

In another example, the present invention can be related to a network component for processing a packet. The network component can include a buffer configured to receive a packet in an ingress port at a network component, a removing unit configured to remove a packet tag from the packet received at the buffer, a packet tag look-up table configured to be indexed by the packet tag removed from the removing unit to obtain a multicast index and a multicast type, and an appending unit configured to append the packet with the multicast index and the multicast type. Moreover, the present invention can have a modifying unit configured to modify an operational code of the packet to be multicast when the multicast type appended by the appending unit is a first predetermined type, a modifying unit configured to modify the operation code of the packet to be IP multicast when the multicast type is a second predetermined type, an assigning unit configured to assign a packet tag priority based on a first class of service of the packet received at the buffer, and a first forwarding unit configured to forward the packet to a first egress port.

Another example of the present invention can be directed to a system of processing a packet in a network component. The system can have a receiving means for receiving a packet in an ingress port at a network component, a first identifying means for identifying a destination address and a network identifier from the packet, an obtaining means for obtaining an outgoing port bit map based on the destination address and the network identifier of the packet, and a forwarding means for forwarding the packet to a destination module and out of an egress port within the network component based on the outgoing port bit map.

In yet another example, the present invention can relate to a system for processing a packet in a network component. The system can include a receiving means for receiving a packet in an ingress port at a network component, a first identifying means for identifying a network identifier from the packet, an accessing means for accessing a packet tag corresponding to the packet, a first obtaining means for obtaining an outgoing port bit map based on the network identifier, a second obtaining means for obtaining a membership port bit map based on the packet tag, a generating means for generating an egress port bit map based on the outgoing port bit map and the membership port bit map, and a forwarding means for forwarding the packet to a destination module and an egress port within the network component based on the egress port bit map.

In another example, the present invention can include a system for processing a packet in a network component. The system can have a receiving means for receiving a packet in an ingress port at a network component, an identifying means for identifying a source module and a source port corresponding to the packet, a first obtaining means for obtaining a packet tag from the packet tag table based on the source module and the source port, and an assigning means for assigning a packet tag priority based on a class of service of the packet. Furthermore, the system can have a second obtaining means for obtaining an ether-type from a register, an appending means for appending the packet received within the buffer with the packet tag, the packet tag priority and the ether-type, and a forwarding means for forwarding the packet appended with the packet tag, the packet tag priority and the ether-type to an egress port within the network component.

In another example, the present invention can include a system for processing a packet in a network component. The said system can have a first receiving means for receiving a packet in an ingress port at a network component, a removing means for removing a packet tag from the packet, a first obtaining means for obtaining a multicast index and a multicast type from indexing the packet tag to a look-up table, and an appending means for appending the packet with the multicast index and the multicast type. In addition, the system can have a first modifying means for modifying an operational code of the packet to multicast when the multicast type is a first predetermined type, a second modifying means for modifying the operation code of the packet to an IP multicast when the multicast type is a second predetermined type, an assigning means for assigning a first class of service for the packet with a packet tag priority, and a first forwarding means for forwarding the packet to a first egress port.

BRIEF DESCRIPTION OF THE DRAWINGS

For proper understanding of the invention, reference should be made to the accompanying drawings, wherein:

FIG. 5(*a*) illustrates one example of a packet inserted with a customer VLAN ID tag in accordance with the present invention;

FIG. 5(*b*) illustrates one example of a packet inserted with a customer VLAN ID tag, an SP VLAN tag, and additional information in accordance with the present invention;

FIG. 6 illustrates one example of a method of processing a packet based on double tagging engine within a TLS network system;

DETAILED DESCRIPTION OF THE PREFERRED EMBODIMENT(S)

Figure 1:
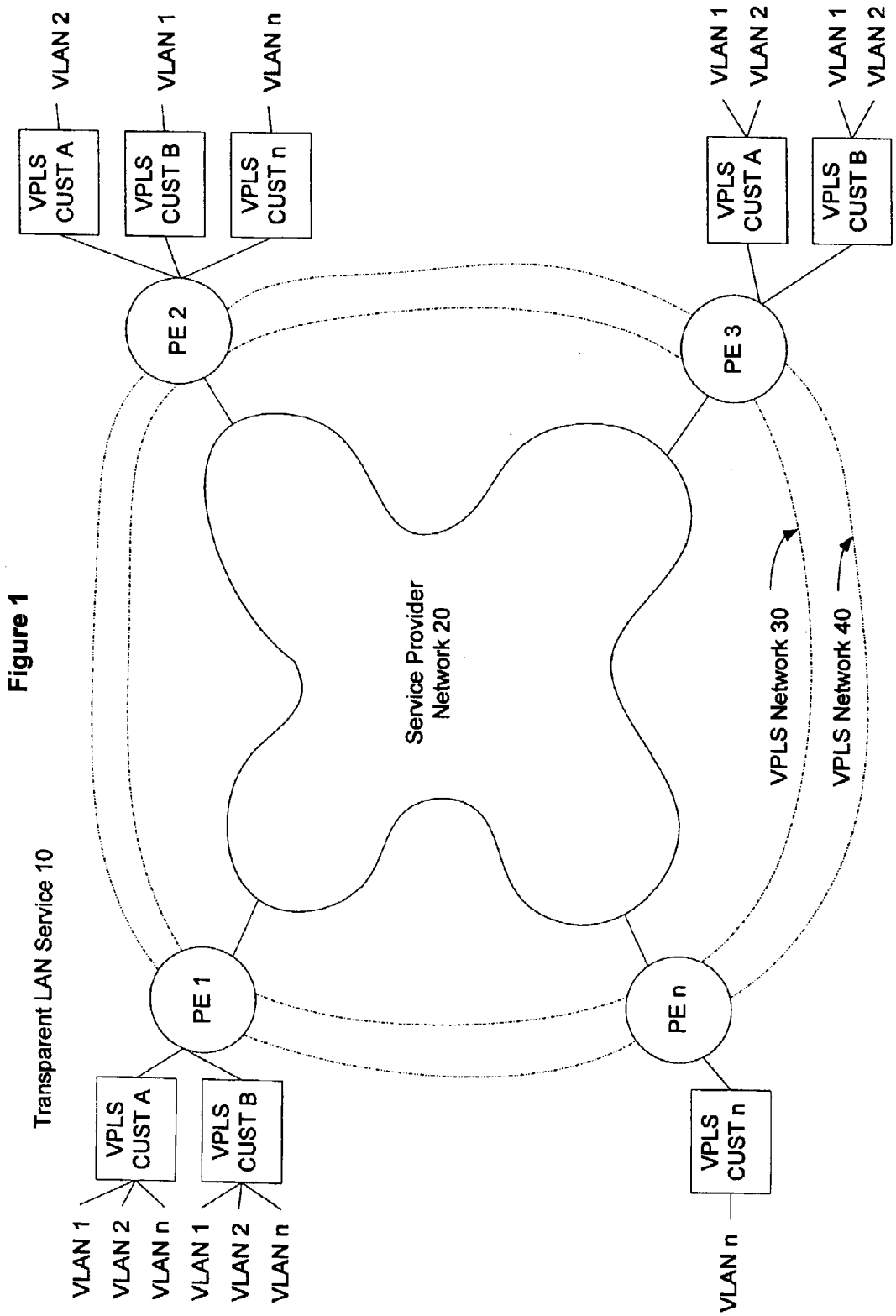
FIG. 1 illustrates one example of a Transparent LAN Service Network System in accordance with the present invention.

FIG. 1 illustrates one example of a fast-path Transparent LAN Service (hereinafter "TLS") network system 10 that can implement double tagging. The TLS network system 10 of this example can be configured to deliver Ethernet or other service to multiple customers geographically dispersed across a network, such as a Wide Area Network (WAN) or Metro Area Network (MAN), as if the multiple customers were connected through a Local Area Network (LAN).

The TLS network system 10 as shown in FIG. 1 illustrates a Service Provider Network (SPN) 20. The SPN 20 can be a packet switched network, such as the Internet. Also, FIG. 1 shows a plurality of Provider Edge (PE) devices PE 1, PE 2, PE 3 . . . PE n connected to the SPN 20.

In addition, FIG. 1 illustrates TLS network system 10 having two VPLS customers, VPLS CUST A and VPLS CUST B. It is noted that although FIG. 1 shows a TLS network system 10 having two VPLS customers, the present invention can be configured to handle a plurality of VPLS customers CUST n within the TLS network system 10.

Each VPLS CUST A and B can be connected to a PE device. In addition, each VPLS customer can have its own plurality of independent Virtual Local Area Networks (VLAN), VLAN 1, VLAN 2 . . . VLAN n. Accordingly, FIG. 1 shows VLAN 1, VLAN 2 . . . VLAN n of VPLS CUST A being "bridged" transparently over SPN 10, wherein a Service Provider VLAN, SP VLAN 30, can be configured to specifically carry all of VPLS CUST A's communication traffic. Similarly, FIG. 1 shows VLAN 1, VLAN 2 . . . VLAN n of VPLS CUST B being "bridged" transparently over SPN 10, wherein SP VLAN 40 can be configured to carry all of VPLS CUST B's communication traffic.

Figure 2:
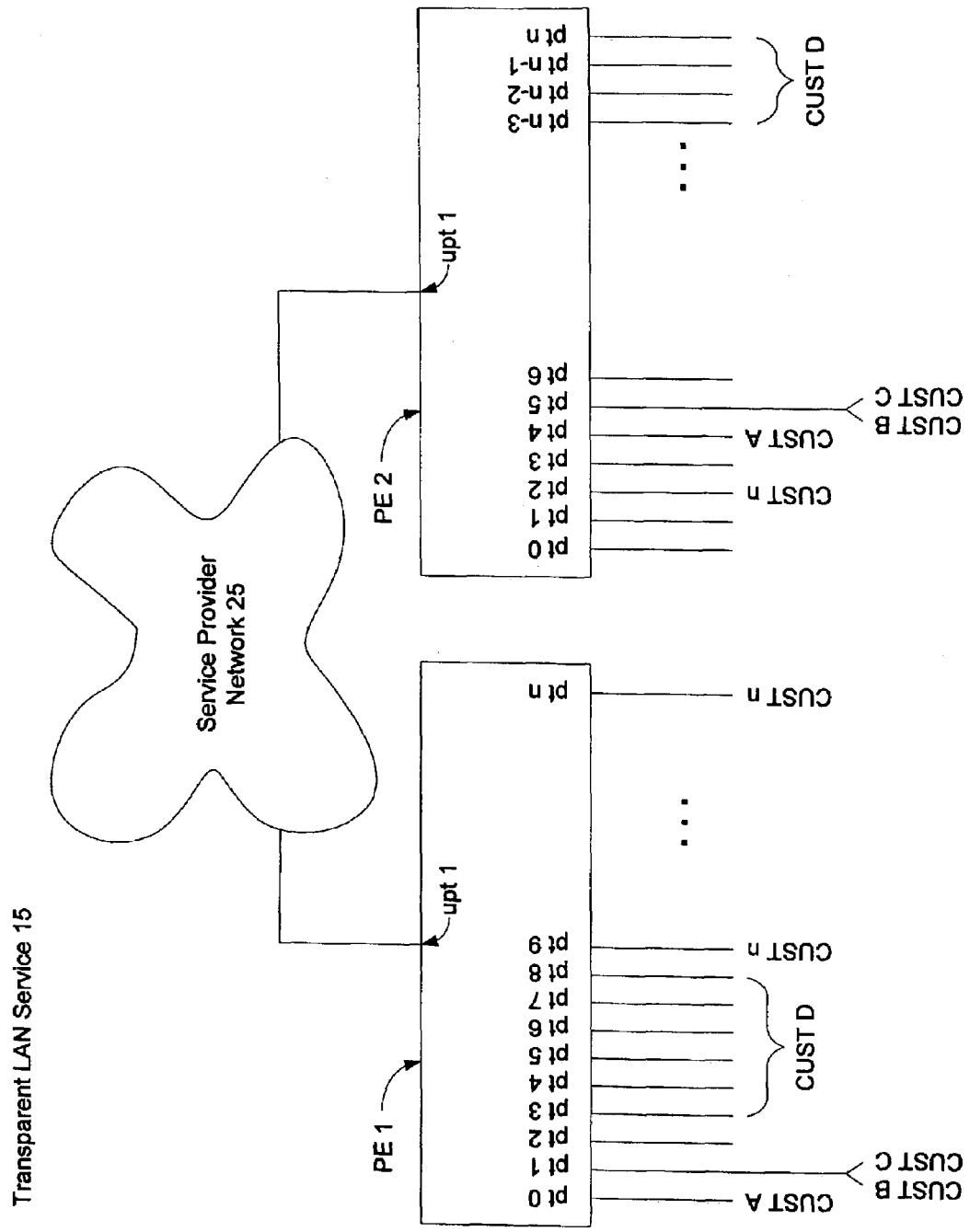
FIG. 2 illustrates another example of a Transparent LAN Service Network System in accordance with the present invention.

FIG. 2 illustrates another example of a TLS network system 15 that can include a SPN 25 and PE devices PE 1 and PE 2. Each PE device can be configured to have a plurality of ports, such as at least one uplink port, upt 1 and one or more customer facing port(s), pt 0, pt 1 . . . pt n. Each port within each of the PE devices can be configured to be a receiving port, or an ingress port, as well as a transmitting port, or an egress port, for receiving and transmitting a packet, respectively. Although the TLS network system 10, 15 of the present example can manage data and/or information in the form of a packet, it is noted that in other examples of the present invention, the TLS network system 10, 15 can be configured to also manage data and/or information in other formats, such as a data frame, or a data cell. Therefore, any reference to a packet herein can also refer to at least a frame, a cell, or a data packet, a data frame or a data cell.

Further shown in FIG. 2, each port within the PE devices can be organized into groups of port(s) for one or more customer(s), wherein each organized group of port(s) can represent a VPLS domain for the TLS network system 15. According to FIG. 2, a specific customer can be provided with one or more port(s) from the PE device. As such, each port from within the organized group of port(s) assigned to the specific customer can be designated to connect with each and every VLAN of that particular customer, or selected VLANs. It is noted that one or more customer(s) can share the same organized group of port(s) from the PE device if each customer share the same set of unique VLAN IDs.

For instance, FIG. 2 shows PE devices PE 1 and PE 2 connected to a SPN 25 via an uplink port upt1, wherein PE 1 and PE 2 can be two geographically dispersed sites. PE 1 and PE 2, each has a plurality of ports pt 0, pt. 1, pt 2, pt 3 . . . pt n therein. Port pt 0 of PE 1 is designated for VPLS CUST A only. Port pt 1 of the same PE device however is designed for two customers, them being VPLS CUST B and C. Furthermore, ports pt 3, pt 4, pt 5, pt 6, pt 7 and pt 8, are organized as a group of ports for VPLS CUST D. As for PE 2, port pt 4 is designated for VPLS CUST A and port pt 5 is designated to both VPLS CUST B and C. Also, ports pt n-3, pt n-2, pt n-1 and pt n, are organized as a group of ports for VPLS CUST D.

Figure 3:
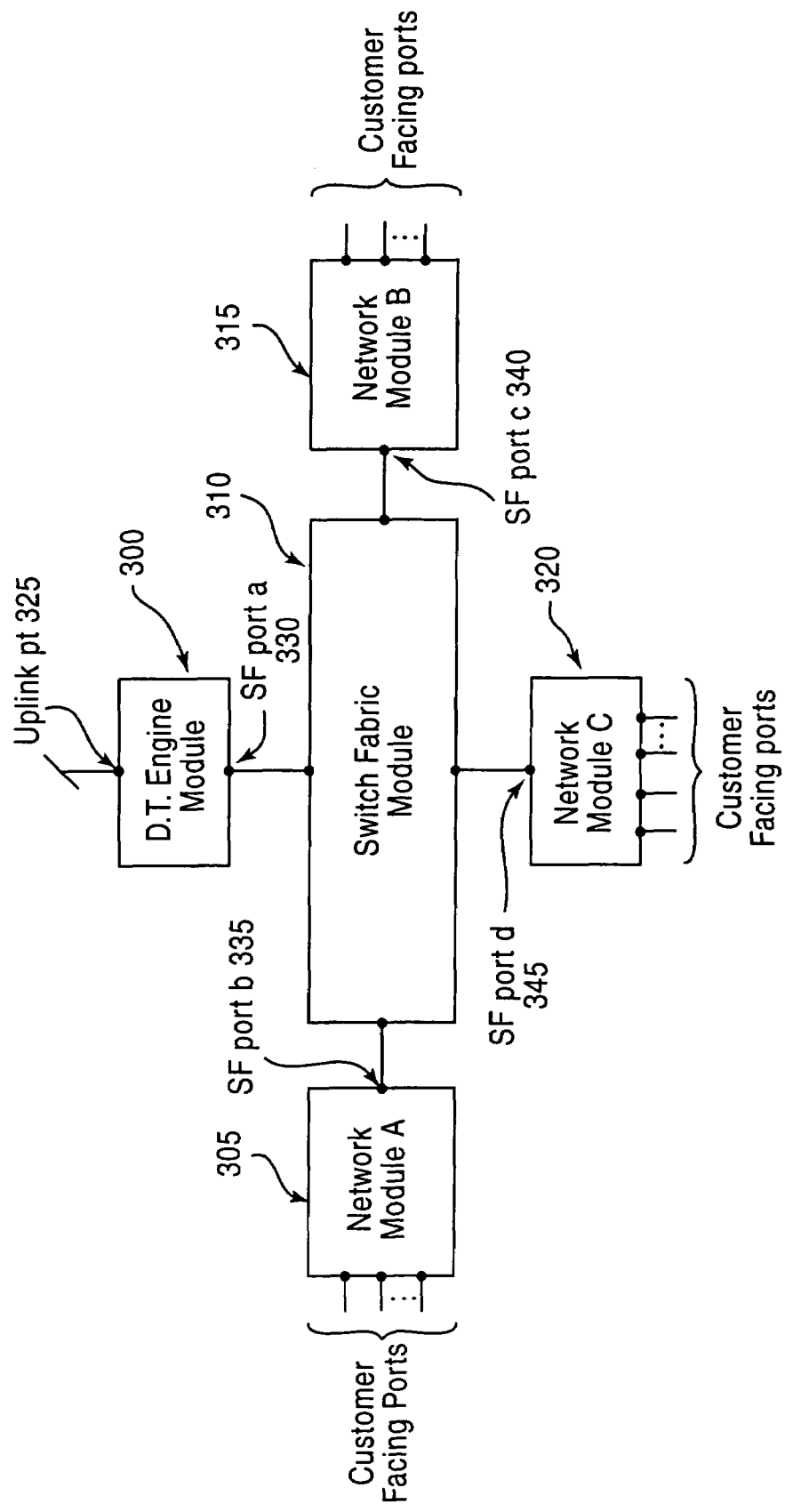
FIG. 3 illustrates one example of a Provider Edge Device in accordance with the present invention.

FIG. 3 illustrates one example of a hardware configuration of a PE device. The hardware configuration of FIG. 3 can be in an integrated, modular and single chip solution, and therefore can be embodied on a semiconductor substrate, such as silicon. Alternatively, the hardware configuration of FIG. 3 can be embodied in a plurality of discrete components on a circuit board.

FIG. 3 shows a PE device that can include a double tagging engine module 300, a network module A 305, a switch fabric module 310, a network module B 315, and a network module C 320. The double tagging engine module 300 can have an uplink port uplink pt 325 that can be an network port for connecting to the Ethernet, such as the Internet. In addition, the double tagging engine module 300 can include a switch fabric port SF port a 330 for connecting to the switch fabric module 310.

The PE device of FIG. 3 also shows a network module A 305, network module B 315, and network module C 320. Each of the network modules A, B and C can be a network switching chip made commercially available through Broadcom® Corporation. Additionally, each of the network modules A, B and C can have one or more customer facing ports, and one switch fabric port. The customer facing ports can connect the PE device to the customers or subscribers of the SPN. The SF ports a, b and c can connect each module to the switch fabric module 310. The customer facing ports and the SF ports a, b and c can be an ingress port as well as an egress port.

The switch fabric module 310 can also be a network switching chip made commercially available through Broadcom® Corporation.

Figure 4:
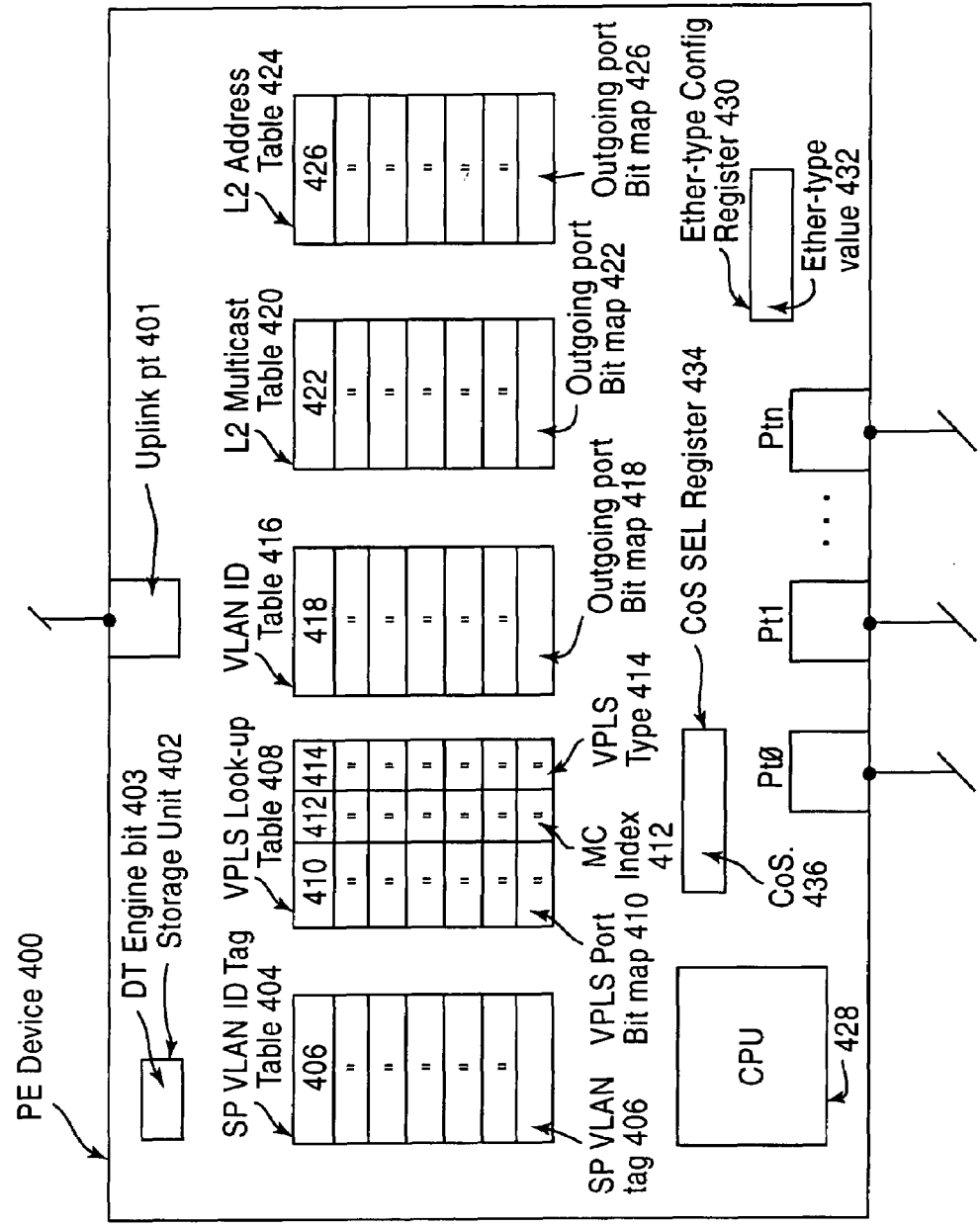
FIG. 4 illustrates another example of a Provider Edge Device in accordance with the present invention.

FIG. 4 illustrates one example of a hardware configuration of a PE device 400. The hardware configuration of FIG. 4 can be in an integrated, modular and single chip solution, and therefore can be embodied on a semiconductor substrate, such as silicon. Alternatively, the hardware configuration of FIG. 4 can be embodied in a plurality of discrete components on a circuit board.

The PE device 400 can be configured to include at least one uplink port uplink pt 401, and a plurality of customer facing ports or subscriber ports, pt 0, pt 1, . . . pt n. As mentioned above, each port within the PE device can be configured to be a receiving port, or an ingress port, as well as a transmitting port, or an egress port, for receiving and transmitting a packet, respectively.

FIG. 5(*a*) illustrates one example of a packet 500 that can be received in or transmitted out of any one of the customer facing ports or subscriber ports pt 0, pt 1, . . . pt n. The packet 500 can be configured to include, at least a destination address field DA, a source address field SA, a customer VLAN identification tag VLAN ID, a type or length field T/L, and a payload P.

The destination address field can be a bit value that can be used by the receiving Media Access Controller (MAC), in order to determine if the incoming packet is addressed to the particular port. There can typically be three types of destination addresses i) unicast/individual or physical DA, ii) multicast or logical DA and iii) broadcast DA. The source address field can be a bit value and can be supplied by the transmitting MAC, which can inserts its own unique address into the source address field as the frame is transmitted, indicating it was the original station. The receiving MAC is not required to take action based on the source address field. Furthermore, the customer VLAN ID tag is a first packet tag inserted within the packet. The VLAN ID tag can identify a particular VLAN for a unique customer. In other words, if a customer has a plurality of VLANs, such as VLAN 1, VLAN . . . VLANn, the customer VLAN ID tag can identify the packet as originating from one of the customer's VLANs. The T/L field can provide the type or the length of the packet. The payload P can contain the actual frame data that is being transferred.

FIG. 5(*b*) illustrates one example of a packet 510 that can be received in or transmitted out of the uplink pt 401. The packet 510 can be configured to include, at least a destination address field DA, a source address field SA, an SP VLAN tag, a customer VLAN identification tag VLAN ID, an Ether-type, a SP VLAN tag priority, an op-code and a payload P.

Packet 510 can include an SP VLAN ID tag, which can be a second tag in the packet 510. The SP VLAN ID tag can specify or identify a customer within the TLS network system 10. In other words, if a TLS network system 10 includes a plurality of customers, such as VPLS CUST A, VPLS CUST B, VPLS CUST C, and VPLS CUST D, the SP VLAN ID tag can identify the packet as originating from and belonging to a particular VPLS customer.

Therefore, packet 510 can include at least a first tag, that being a customer VLAN ID tag, and a second tag, that being a SP VLAN ID tag. The SP VLAN ID tag can identify the packet as belonging to a particular VPLS customer, and the VLAN ID tag can identify the particular VLAN belonging to that VPLS customer. Accordingly, a packet having a first and second tag can always be identified as belonging to a unique VPLS customer, even if a plurality of the VPLS customer have overlapping or common VLAN IDs.

FIG. 4 can include a storage unit 402, such as a register. The storage unit 402 can be configured to store a one-bit DT engine bit 403. The DT engine bit 403 can either be set or not set by preprogramming. For example, the DT engine bit 403 can have either the value of "1" which sets the DT engine bit 403, or the value of "0" which un-set the DT engine bit 403. When the DT engine bit 403 is set, then the PE device 400 can be operating under tagging engine mode. For instance, a bit value of "1" can indicate that the PE device 400 is operating under double tagging engine mode, and whereby a bit value of "0" can indicate that the PE device 400 is not operating under double tagging engine mode.

Furthermore, the PE device 400 of FIG. 4 can be configured to include a plurality of look-up tables, such as an SP VLAN ID tag look-up table 404, a VPLS look-up table 408, a VLAN look-up table 416, an L2 multicast look-up table 420, and an L2 address look-up table 424.

The SP VLAN ID tag look-up table 404 can include one or more SP VLAN ID tag(s) 406 therein and can be indexed by a source module and a source port from a packet. The SP VLAN ID tag(s) 406 within the table 404 can be obtained when a packet received at the PE device 400 is to be forwarded to the uplink port 401, wherein the packet is to be double tagged.

The VPLS look-up table 408 can have one or more entries therein. The VLPS look-up table 408 can be indexed by a SP VLAN ID tag so that one or more entries therein may be accessed or identified. Each mask entry can be configured to have a VPLS port bit map 410 or a membership port bit map therein. The VPLS port bit map 410 can be a bit string having a bit length that can be equal, for example, to a number of ports with the PE device 400. Each bit position of the VPLS port bit map 410 can correspond to a particular port within the PE device 400. In essence, the VPLS port bit map 410 can be configured to identify a group of one or more port(s) that correspond or belong to a particular VPLS membership for a PE device. In other words, the VPLS port bit map 410 can identify a group of one or more port(s) to which an unique customer's VLAN(s) can be mapped. Accordingly, each bit position of the VPLS port bit map 410 can be set with a value or condition of either "1" or "0". By setting a bit position within the VPLS port bit map 410 with a value or condition of "1", the port corresponding to the bit position can be included as part of the group of port(s) associated with the VPLS membership. In the alternative, by setting a bit position within the VPLS port bit map 410 with a value or condition of "0", the port corresponding to the bit position can be excluded from the group of port(s) associated with the VPLS membership.

In addition, each entry within the VPLS look-up table 408 can include a Layer 2 multicast index 412 and a VPLS type 414. The Layer 2 multicast index 412 and the VPLS type 414 can correspond to a VPLS port bit map 410.

FIG. 4 also shows a VLAN ID look up table 416 within the PE device 400. The VLAN ID look-up table 416 can include one or more preprogrammed mask entries therein. Each mask entry can be configured to be an outgoing port bit map 418. The outgoing bit map 418 can be a bit string having any bit length. Each bit position of the outgoing bit map 418 can correspond to a particular port of a particular module within the PE device 400 for a particular VLAN ID. In essence, the outgoing bit map 418 can be configured to identify one or more outgoing port(s) with respect to a particular VLAN ID. Accordingly, each bit position of the outgoing bit map 418 can be set with a value or condition of either "1" or "0". By setting a bit position within the outgoing bit map 418 with a value or condition of "1", the port of a specified module corresponding to the bit position can be identified or specified as an outgoing port associated with a particular customer VLAN ID. In the alternative, by setting a bit position within the outgoing bit map 418 with a value or condition of "0", the port of a specified module corresponding to the bit position can be identified or specified as not being included as an outgoing port of a particular customer VLAN ID.

The VLAN ID look-up table 416 can be indexed by the VLAN ID tag from the packet 500 of FIG. 5(*a*) as an example. Upon receiving the packet in an ingress port, the VLAN ID can be identified and indexed into the VLAN ID look-up table 416, wherein one VLAN ID mask entry having an outgoing port bit map 418 can be identified.

FIG. 4 also shows an L2 Multicast look-up table 420 within the PE device 400. The L2 Multicast look-up table 420 can include one or more preprogrammed mask entries therein, and the size of the L2 Multicast lookup table 420 can equal to the number of multicast groups supported by the PE device 400. In addition, each mask entry within the L2 Multicast look-up table 420 can be accessed or identified by using the customer VLAN ID and the multicast DA within the packet received. Each entry can contain a list of ports which map to a L2 multicast group.

Each mask entry within the L2 Multicast look-up table 420 can be configured to be an outgoing port bit map 422 which can be a list of ports which maps to an L2 Multicast group. The L2 Multicast look-up table 420 can be used to flood multicast packets to only those ports which have memberships of the L2 multicast group. In other words, rather than flooding a packet to the entire group of ports belonging to a particular VLAN ID, each outgoing port bit map 422 within the L2 Multicast table can be used to flood a packet to only the ports having membership of the L2 multicast group.

The outgoing port bit map 422 within the L2 Multicast look-up table 420 can be a bit string having any bit length. Each bit position of the outgoing port bit map 422 can correspond to a particular port within the PE device 400 having an L2 multicast membership. In essence, the outgoing port bit map 422 can be configured to identify one or more outgoing port(s) with respect to a particular L2 multicast group. Accordingly, each bit position of the outgoing port bit map 422 can be set with a value or condition of either "1" or "0". By setting a bit position within the outgoing port bit map 422 with a value or condition of "1", the port corresponding to the bit position can be identified or specified as an outgoing port associated with a particular L2 multicast membership with respect to the packet received. In the alternative, by setting a bit position within the outgoing port bit map 422 with a value or condition of "0", the port corresponding to the bit position can be identified or specified as not being included as an outgoing port of a particular L2 multicast group with respect to the packet received.

Furthermore, FIG. 4 shows an L2 Address look-up table 424 within the PE device 400. The L2 Address look-up table 424 can include one or more preprogrammed mask entries therein. In addition, each mask entry within the L2 Address look-up table 424 can be accessed or identified by indexing the customer VLAN ID and the DA within the packet received.

Each mask entry within the L2 Address look-up table 424 can be configured to be an outgoing port bit map 426. The outgoing port bit map 426 within the L2 Address look-up table 424 can be a bit string having any bit length. Each bit position of the outgoing port bit map 426 can correspond to a port within the PE device 400. In essence, the outgoing port bit map 426 can be configured to identify one or more outgoing port(s) with respect to a packet received. Similar to above, each bit position of the outgoing bit map 426 can be set with a value or condition of either "1" or "0". By setting a bit position within the outgoing bit map 426 with a value or condition of "1", the port corresponding to the bit position can be identified or specified as an outgoing port with respect to the packet received. In the alternative, by setting a bit position within the outgoing bit map 426 with a value or condition of "0", the port corresponding to the bit position can be identified or specified as not being an outgoing port with respect to the packet received.

The PE device of FIG. 3 can also include a CPU 428. The CPU 428 can be configured to implement a plurality of tasks and operations.

In addition, the PE device 400 of FIG. 4 can include an Ether-type configuration register 430. The Ether-type configuration register 430 can be configured to store an Ether-type value and can be accessed and inserted into a packet transmitted from an uplink port. Also, the PE device 400 can have one or more class of service select register(s) 434 for storing a class of service type. The class of service select register(s) 434 can correspond to a customer port.

FIGS. 6-10 illustrate one or more examples of a method of processing and double tagging a packet based on a double tagging engine thereof in accordance with the present invention. The method of the present example can be implemented in hardware, or software, or a combination of both hardware and software.

FIG. 6 shows one example of a method of processing a packet received on an Ethernet access port of a module based on a double tagging engine. A known Layer 2 unicast or a known Layer 2 multicast packet can be received at a customer subscriber port at step 600. A known unicast packet can be a packet that is relayed or transmitted to only one known destination port. In contrast, a known multicast packet can be a packet that is relayed or transmitted to a multiple known destination ports. Moreover, an unknown unicast/multicast/broadcast packet can be a destination-lookup-failure packet. In other words, a received packet can be an unknown unicast/multicast/broadcast packet due to a failure in the destination address (DA) lookup for the packet received. Therefore, if the destination address lookup is not successful, then the destination port or ports with respect to the packet received is unknown.

Therefore, a known unicast or a known mulitcast packet can be received at one of the customer facing ports of a PE device. Once the packet is received, a destination address and a customer VLAN ID can be identified from the packet at step 605.

After identifying the destination address and the customer VLAN ID from the packet, an outgoing port bit map can be obtained from a look-up table at step 610. If the packet received is a known unicast packet, then the outgoing port bit map can be obtained from an L2 Address look-up table. However, if the packet received is a known multicast packet, then the outgoing port bit map can be obtained from an L2 Multicast look-up table.

Once the outgoing port bit map is obtained, a fast filtering processor can assign a class of service (CoS) to the module header of the packet based on a service level agreement (SLA) at step 615. Thereafter, the packet can be forwarded to one or more destination module(s) and one or more egress port(s) based on the outgoing port bit map at step 620.

Figure 7:
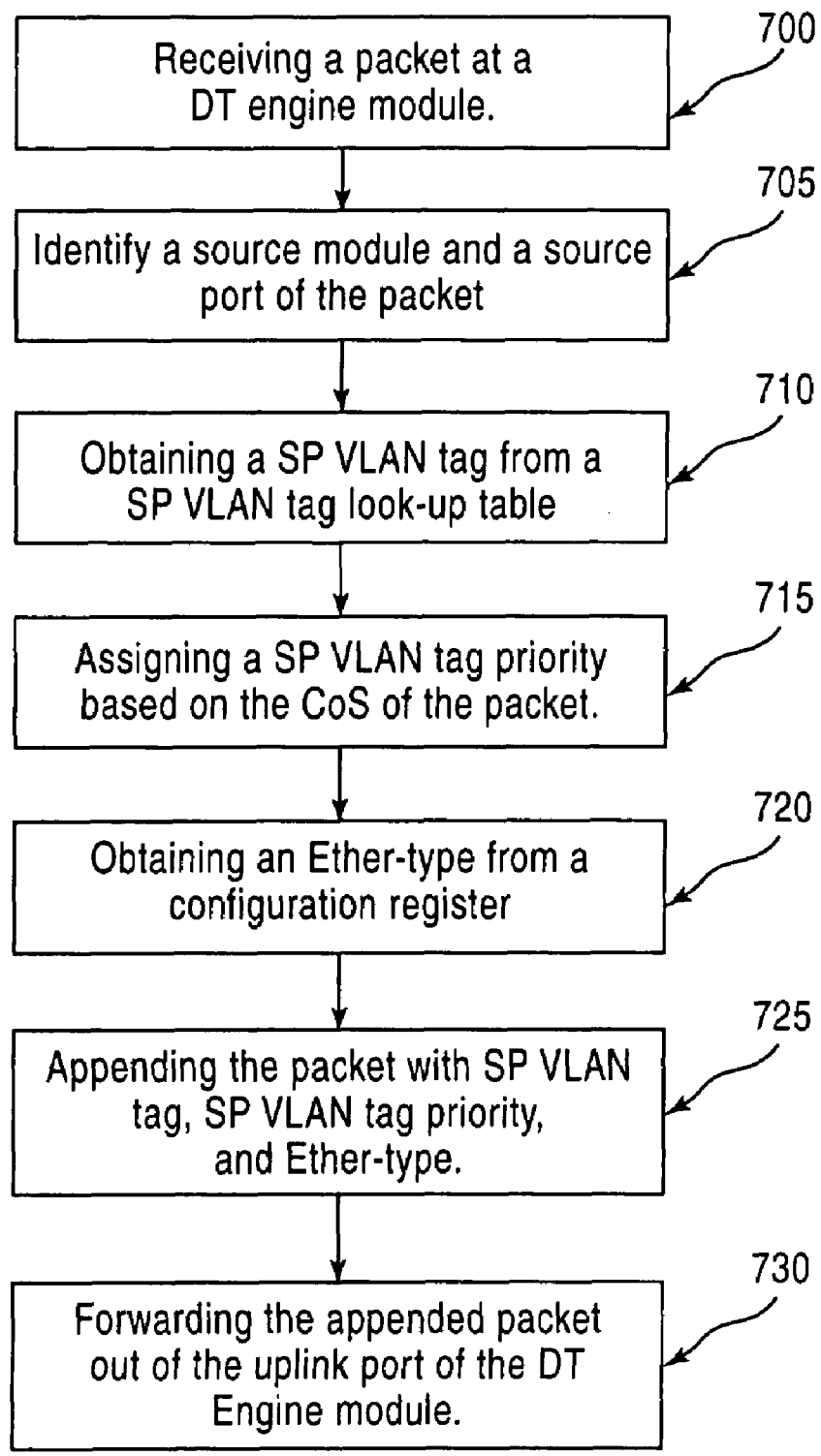
FIG. 7 illustrates another example of a method of processing a packet based on double tagging engine within a TLS network system.

FIG. 7 shows one example of a method of processing a packet received on an Ethernet access port of a DT engine module based on a double tagging engine. A known Layer 2 unicast, known Layer 2 multicast, or an unknown Layer 2 unicast, multicast or broadcast packet can be received at a Ethernet access port of a DT engine module at step 700. Once the packet is received at the Ethernet access port of the DT engine module, a source module and a source port corresponding to the packet is identified at step 705. In other words, the source module and the source port indicate the source where the packet originated therefrom.

Thereafter, the source module and the source port can be indexed to a SP VLAN tag look-up table to obtain a SP VLAN tag, which corresponds to the source module and the source port at step 710. Once the SP VLAN tag is obtained from the SP VLAN tag look-up table, a SP VLAN tag priority can be assigned to the packet based on the CoS of the packet at step 715. Additionally, an Ether-type value can be obtained from an Ether-type configuration register at step 720.

After obtaining the SP VLAN tag, and an Ether-type value, and assigning a SP VLAN tag priority, the packet received can be appended with the above information at step 725. In other words, the packet received at the Ethernet access port of a DT engine module can be appended with a SP VLAN tag, a SP VLAN tag priority and a Ether-type value therein. Once the packet is appended with such information, the packet can be forwarded out of the uplink port of the DT engine module to a SPN at step 730.

Figure 8:
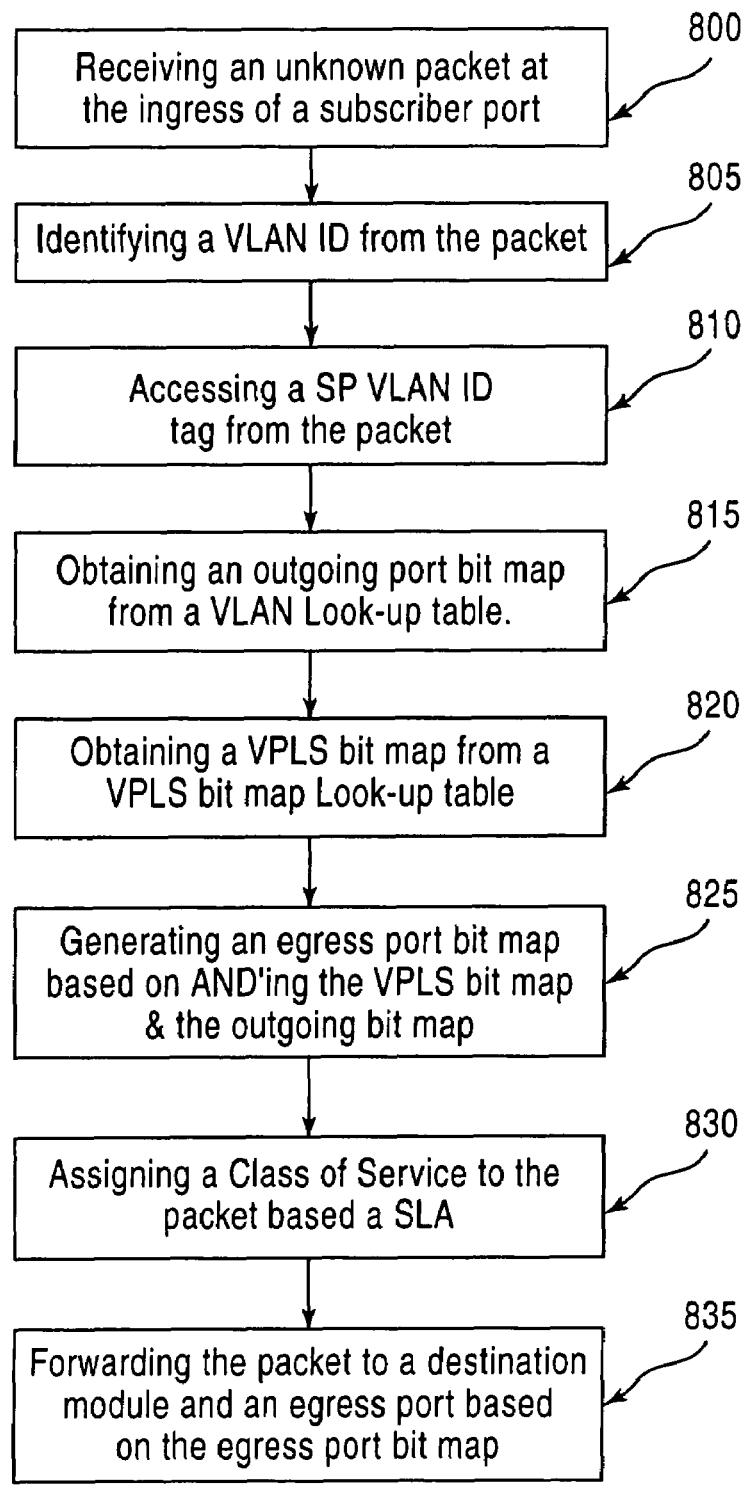
FIG. 8 illustrates yet another example of a method of processing a packet based on double tagging engine within a TLS network system.

FIG. 8 shows one example of a method of processing a packet received on an Ethernet access port of a module based on a double tagging engine. An unknown Layer 2 unicast, multicast and broadcast packet can be received at subscriber port or a customer facing port of one or more network switching module such as Draco, or Tucana at step 800. Once the packet is received, a customer VLAN ID can be identified from the packet at step 805. In addition, a SP VLAN ID tag, can be identified from the packet at step 810.

After the VLAN ID and the SP VLAN ID tag have been identified from the packet, the VLAN ID can be indexed to a VLAN ID look-up table and the SP VLAN ID tag can similarly be indexed to a SP VLAN ID look-up table. Thus, an outgoing port bit map can be obtained from indexing the VLAN ID to the VLAN ID look-up table at step 815, and a VPLS port bit map or a membership port bit map can also be obtained from indexing the SP VLAN ID tag to the SP VLAN ID look-up table.

Once the outgoing port bit map and the VPLS port bit map are obtained, a logical AND operation can be performed on the two port bit maps to generate an egress port bit map at step 825. Thereafter, a CoS can be assigned to the packet based on a SLA at step 830, and the packet can be forwarded to one or more destination module(s) and an egress port based on the egress port bit map at step 835.

Figure 9:
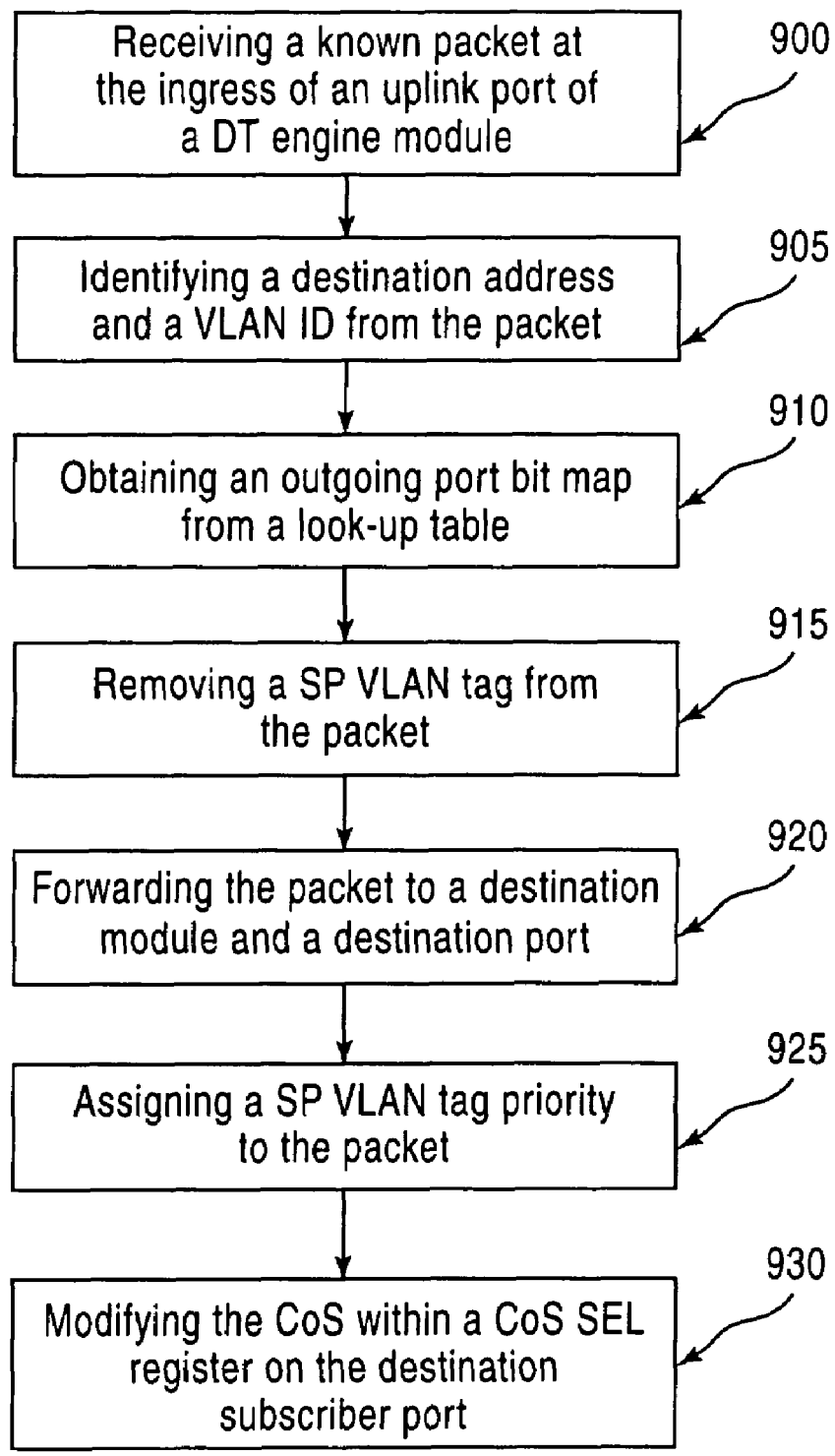
FIG. 9 illustrates one additional example of a method of processing a packet based on double tagging engine within a TLS network system.

FIG. 9 shows one example of a method of processing a packet received on an uplink port or HiGig ingress port of a DT engine module based on a double tagging engine. A Layer 2 known unicast or a layer 2 know multicast packet can be received at the uplink port of a DT engine module at step 900. Once the packet is received, a destination address and a customer VLAN ID can be identified from the packet at step 905.

After identifying the destination address and the customer VLAN ID from the packet, an outgoing port bit map can be obtained from a look-up table at step 910. If the packet received is a known unicast packet, then the outgoing port bit map can be obtained from an L2 Address look-up table. However, if the packet received is a known multicast packet, then the outgoing port bit map can be obtained from an L2 Multicast look-up table.

Once the outgoing port bit map is obtained, a SP VLAN ID tag can be identified and removed form the packet at step 915. Thereafter, the packet can be forwarded to one or more destination module(s) and one or more egress port(s) based on the outgoing port bit map at step 920. The packet can be assigned a SP VLAN tag priority to the CoS at step 925, and the CoS SEL register can be modified on the subscriber egress port(s) to match the CoS of the packet at step 930.

Figure 10:
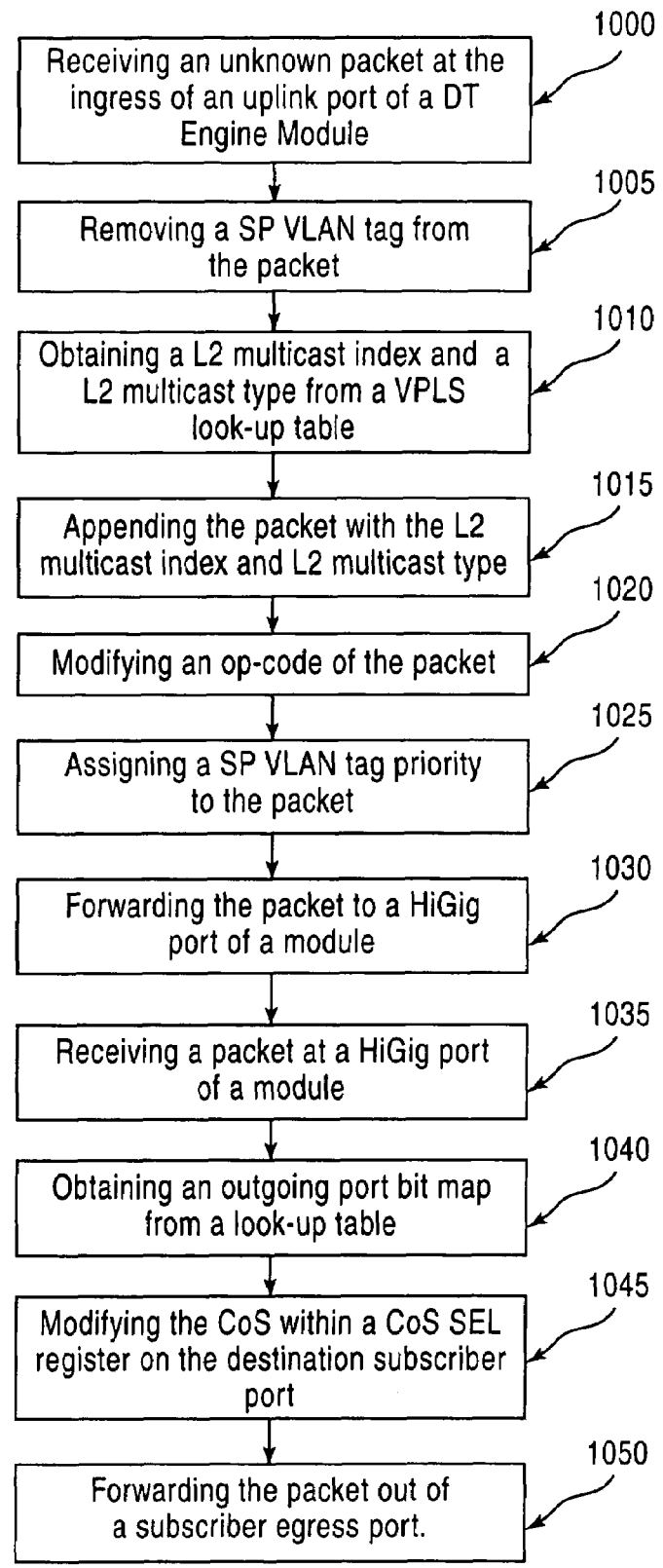
FIG. 10 illustrates another example of a method of processing a packet based on double tagging engine within a TLS network system.

FIG. 10 shows one example of a method of processing a packet received on an uplink port or high Gigabit ingress port of a DT engine module based on a double tagging engine. A Layer 2 unknown unicast, broadcast, and multicast packet can be received at an ingress uplink port of a DT engine module at step 1000. Upon receiving the packet, a SP VLAN ID tag can be identified and removed from the packet at step 1005.

The identified SP VLAN ID tag can be indexed to a Layer 2 multicast look-up table and obtain a L2 multicast index and a L2 multicast type from the look-up table at step 1010. The packet can be appended with the L2 multicast index and the L2 multicast type at step 1015. Once the packet is appended with the multicast index and the multicast type, the operation code (op-code) within the module header of the packet can be modified to "multicast" when the multicast type appended within the packet matches a first predetermined type value at step 1020. Additionally, the operation code (op-code) within the module header of the packet can be modified to "IP multicast" when the multicast type appended within the packet matches a second predetermined type value also at step 1020.

Once the packet is appended with the multicast index and type, and the op-code within the module header of the packet is modified, a SP VLAN ID priority can be assigned to the packet's CoS at step 1025. Thereafter, the packet can be forwarded to a high Gigabit ingress port of a network switching module within a PE device at step 1030.

The packet can be received at the high Gigabit port of a module with a PE device at step 1035. Once the packet is received, an outgoing port bit map can be obtained from indexing the L2 multicast look-up table at step 1040. After the outgoing port bit map is obtained, the CoS SEL register can be modified on the subscriber egress port(s) to match the CoS of the packet at step 1045, and thereafter the packet can be forwarded out of one or more subscriber customer facing port(s) based on the outgoing port bit map at step 1050.

The above-disclosed system configurations of the present invention can be embodied within a Virtual Private LAN Service (VPLS), a Transparent LAN Service (TLS), a Virtual Private Switched Network Service (VPSNS), or any Layer 2 Virtual Private Network (VPN). In addition, the above-disclosed hardware configuration can be embodied in a semiconductor substrate, such as silicon. Furthermore, the methods of the invention can be implemented in hardware, or software, or a combination of both hardware and software. In addition, a person of skill in the art with respect to network system design and/or semiconductor design and manufacturing would be able to implement the various network systems, elements and methods of the present invention onto a single system or onto a single semiconductor substrate, respectively, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of processing a packet in a communications network, said method comprising:
   receiving a packet in an ingress port at a network component;
   identifying a destination address and a customer identifier from the packet, the customer identifier comprising a first packet tag and a second packet tag;
   obtaining an outgoing port bit map based on the destination address and the customer identifier of the packet;
   forwarding the packet to a destination module and out of an egress port within the network component based on the outgoing port bit map;
   removing one of the first packet tag and the second packet tag from the packet;
   assigning a first class of service to a packet tag priority for the packet; and
   modifying a second class of service stored within a register to match the first class of service when the egress port is a subscriber port.

2. The method of claim 1, further comprising:
   identifying the outgoing port bit map from an address look-up table based on the destination address and the customer identifier of the packet when the packet is a known unicast packet; and
   identifying the outgoing port bit map from a multicast look-up table based on the destination address and the customer identifier of the packet when the packet is a known multicast packet.

3. The method of claim 1, further comprising:
   identifying a service level agreement; and
   assigning a class of service to the packet based on the service level agreement.

4. A method of processing a packet in a communications network, said method comprising:
   receiving a packet in an ingress port at a network component;
   identifying a customer identifier from the packet, the customer identifier comprising a first packet tag and a second packet tag;
   obtaining an outgoing port bit map based on one of the first packet tag and the second packet tag;
   obtaining a membership port bit map based on the other of the first packet tag and the second packet tag;
   generating an egress port bit map based on the outgoing port bit map and the membership port bit map;

forwarding the packet to a destination module and an egress port within the network component based on the egress port bit; and modifying a first class of service stored within a register to match a second class of service corresponding to the packet when the egress port is a subscriber port.

5. The method of claim 4, further comprising:
obtaining the outgoing port bit map from a customer identifier look-up table based on the customer identifier when the packet is an unknown unicast packet, an unknown multicast packet, or an unknown broadcast packet.

6. The method of claim 4, further comprising: identifying a service level agreement; and
assigning a class of service to the packet based on the service level agreement.

7. The method of claim 4, wherein the generating the egress port bit map comprises:
implementing a logical AND operation between the outgoing port bit map and the membership port bit map.

8. A method of processing a packet in a communications network, said method comprising:
receiving a packet in an ingress port at a network component;
identifying a source module and a source port corresponding to the packet;
obtaining a customer identifier from a look-up table based on the source module and the source port, the customer identifier comprising a first packet tag and a second packet tag;
assigning a packet tag priority based on a class of service of the packet;
obtaining an ether-type from a register;
appending the packet received within a buffer with the customer identifier, the packet tag priority, and the ether-type;
forwarding the packet appended with the customer identifier, the packet tag priority, and the ether-type to an egress port within the network component; and
modifying a first class of service stored within the register to match a second class of service corresponding to the packet when the egress port is a subscriber port.

9. The method of claim 8, further comprising: forwarding the packet appended with the customer identifier, the packet tag priority and the ether-type to an uplink port within the network component.

10. A method of processing a packet in a communications network, said method comprising:
receiving a packet in an ingress port at a network component, the packet comprising a first packet tag and a second packet tag;
removing one of the first packet tag or the second packet tag from the packet;
obtaining a multicast index and a multicast type from indexing the packet tag to a look-up table;
appending the packet with the multicast index and the multicast type;
modifying an operational code of the packet to multicast when the multicast type is a first predetermined type;
modifying the operation code of the packet to an IP multicast when the multicast type is a second predetermined type;
assigning a first class of service for the packet with a packet tag priority;
modifying a second class of service stored within a register to match the first class of service when an egress port is a subscriber port; and forwarding the packet to a first the egress port.

11. The method of claim 10, wherein the forwarding the packet comprises forwarding the packet to a gigabit port.

12. The method of claim 11, further comprising:
receiving the packet at the gigabit port of a module within the network component;
obtaining an outgoing port bit map from a multicast look-up table based on the packet;
modifying a second class of service stored within a register to match the first class of service, wherein the register corresponds to a subscriber port; and
forwarding the packet out of a second egress port within the network component based on the outgoing port bit map.

13. A network component for processing a packet, the network component comprising:
a buffer configured to receive a packet in an ingress port at a network component;
a first identification unit configured to identify a destination address and a customer identifier from the packet received at the buffer, the customer identifier comprising a first packet tag and a second packet tag;
a look-up table configured to be indexed by the destination address and the customer identifier identified by the identification unit to obtain an outgoing port bit map;
a forwarding unit configured to forward the packet to a destination module and out of an egress port within the network component based on the outgoing port bit map;
a removing unit configured to remove one of a first packet tag and a second packet tag from the packet received at the buffer;
an assigning unit configured to assign a first class of service to a packet tag priority for the packet received at the buffer; and
a class of service register configured to store a second class of service, wherein the second class of service is modified to match the first class of service when the egress port is a subscriber port.

14. The network component of claim 13, wherein the look-up table comprises an address look-up table configured to be indexed by the destination address and the customer identifier identified by the identification unit when the packet is a known unicast packet, and
wherein the look-up table comprises a multicast look-up table configured to be indexed by the destination address and the customer identifier identified by the identification unit when the packet is a known multicast packet.

15. The network component of claim 13, further comprising:
a second identification unit configured to identify a service level agreement corresponding to the packet received at the buffer; and
an assigning unit configured to assign a class of service to the packet based on the service level agreement identified by the second identification unit.

16. A network component for processing a packet, the network component comprising:
a first buffer configured to receive a packet in an ingress port at a network component;
a first identification unit configured to identify a customer identifier from the packet received at the buffer, the customer identifier comprising a first packet tag and a second packet tag;
an accessing unit configured to access a packet tag corresponding to the packet received at the buffer;

an outgoing port look-up table configured to be indexed by one of the first packet tag and the second packet tag identified by the identification unit to obtain an outgoing port bit map;

a membership look-up table configured to be indexed by the other of the first packet tag and the second packet tag accessed by the accessing unit to obtain a membership port bit map;

a second buffer configured to store an egress port bit map based on the outgoing port bit map from the outgoing look-up table and the membership port bit map from the membership look-up table;

a forwarding unit configured to forward the packet to a destination module and an egress port within the network component based on the egress port bit map stored at the second; and a class of service register configured to store a first class of service, wherein the first class of service is modified to match the second class of service of the packet received at the buffer when the egress port is a subscriber port.

17. The network component of claim 16, wherein the outgoing port look-up table comprises a customer identifier outgoing port look-up table when the packet received at the first buffer is an unknown unicast packet, an unknown multicast packet, or an unknown broadcast packet.

18. The network component of claim 16, further comprising:
    a second identification unit configured to identify a service level agreement corresponding to the packet received at the buffer; and
    an assigning unit configured to assign a class of service to the packet based on the service level agreement identified by the second identification unit.

19. The network component of claim 16, wherein the second buffer is configured to store the egress port bit map based on implementing a logical AND operation between the outgoing port bit map and the membership port bit map.

20. A network component for processing a packet, said network component comprising:
    a buffer configured to receive a packet in an ingress port at a network component;
    an identifying unit configured to identify a source module and a source port corresponding to the packet received at the buffer;
    a customer identifier look-up table configured to be indexed by the source module and the source port identified by the identifying unit to obtain a customer identifier, the customer identifier comprising a first packet tag and a second packet tag;
    an assigning unit configured to assign a packet tag priority based on a class of service of the packet received at the buffer;
    a register configured to store an ether-type;
    an appending unit configured to append the packet received at the buffer with the customer identifier, the packet tag priority, and the ether-type;
    a forwarding unit configured to forward the packet appended with the customer identifier, the packet tag priority, and the ether-type by the appending unit, to an egress port within the network component; and
    a class of service register configured to store a first class of service, wherein the first class of service is modified to match the second class of service of the packet received at the buffer when the egress port is a subscriber port.

21. The network component of claim 20, wherein the forwarding unit is configured to forward the packet appended with the customer identifier, the packet tag priority and the ether-type to an uplink port within the network component.

22. A network component for processing a packet, said network component comprising:
    a buffer configured to receive a packet in an ingress port at a network component;
    a removing unit configured to remove a packet tag from the packet received at the buffer;
    a packet tag look-up table configured to be indexed by the packet tag removed from the removing unit to obtain a multicast index and a multicast type;
    an appending unit configured to append the packet with the multicast index and the multicast type;
    a modifying unit configured to modify an operational code of the packet to be multicast when the multicast type appended by the appending unit is a first predetermined type;
    a modifying unit configured to modify the operation code of the packet to be IP multicast when the multicast type is a second predetermined type;
    an assigning unit configured to assign a packet tag priority based on a first class of service of the packet received at the buffer; and
    a first forwarding unit configured to forward the packet to a first egress port.

23. The network component of claim 22, wherein the forwarding unit is configured to forward the packet to a gigabit port at the network component.

24. The network component of claim 23, further comprising:
    a first identification unit configured to identify a network identifier and a destination address of the packet received at the buffer; and
    an outgoing port look-up table configured to be indexed by the network identifier and the destination address identified by the identification unit to obtain an outgoing port bit map.

25. The network component of claim 24, further comprising:
    a receiving unit configured to receive the packet at the gigabit port of a module within the network component;
    a class of service register configured to store a second class of service, wherein the second class of service is modified to match the first class of service when the egress port is a subscriber port; and
    a second forwarding unit configured to forward the packet out of a second egress port within the network component based on the outgoing port bit map.

26. A system for processing a packet in a network component, the system, comprising:
    a receiving means for receiving a packet in an ingress port at a network component;
    a first identifying means for identifying a destination address and a customer identifier from the packet, the customer identifier comprising a first packet tag and a second packet tag;
    an obtaining means for obtaining an outgoing port bit map based on the destination address and the customer identifier of the packet;
    a forwarding means for forwarding the packet to a destination module and out of an egress port within the network component based on the outgoing port bit maps
    a removing means for removing one of the first packet tag and the second packet tag from the packet;
    an assigning means for assigning a first class of service to a nacket tag priority for the packet; and p1 a modifying means for modifying a second class of service stored within a resister to match the first class of service when the egress port is a subscriber port.

27. The system of claim 26, wherein the first identifying means identifies the outgoing port bit map from an address look-up table based on the destination address and the customer identifier of the packet when the packet is a known unicast packet, and wherein the first identifying means is configured to identify the outgoing port bit map from a multicast look-up table based on the destination address and the customer identifier of the packet when the packet is a known multicast packet.

28. The system of claim 26, further comprising:
a second identifying means for identifying a service level agreement; and
an assigning means for assigning a class of service to the packet based on the service level agreement.

29. A system for processing a packet in a network component, said system, comprising:
a receiving means for receiving a packet in an ingress port at a network component;
a first identifying means for identifying a customer identifier from the packet, the customer identifier comprising a first packet tag and a second packet tag;
a first obtaining means for obtaining an outgoing port bit map based on one of the first packet tag and the second packet tag;
a second obtaining means for obtaining a membership port bit map based on the other of the first packet tag and the second packet tag;
a generating means for generating an egress port bit map based on the outgoing port bit map and the membership port bit map;
a forwarding means for forwarding the packet to a destination module and an egress port within the network component based on the egress port bit; and
a modifying means for modifying a first class of service stored within a register to match a second class of service corresponding to the vacket when the egress port is a subscriber port.

30. The system of claim 29, wherein the first obtaining means obtains the outgoing port bit map from a customer identifier look-up table based on the customer identifier when the packet is an unknown unicast packet, an unknown multicast packet, or an unknown broadcast packet.

31. The system of claim 29, further comprising:
a second identifying means for identifying a service level agreement; and
an assigning means for assigning a class of service to the packet based on the service level agreement.

32. The system of claim 29, wherein the generating means is configured to generate the egress port bit map by implementing a logical AND operation between the outgoing port bit map and the membership port bit map.

33. A system for processing a packet in a network component, the system, comprising:
a receiving means for receiving a packet in an ingress port at a network component;
an identifying means for identifying a source module and a source port corresponding to the packet;
a first obtaining means for obtaining a customer identifier from a customer identifier look-up table based on the source module and the source port, the customer identifier comprising a first packet tag and a second packet tag;
an assigning means for assigning a packet tag priority based on a class of service of the packet;
a second obtaining means for obtaining an ether-type from a register;
an appending means for appending the packet received within a buffer with the customer identifier, the packet tag priority, and the ether-type;
a forwarding means for forwarding the packet appended with the customer identifier, the packet tag priority, and the ether-type to an egress port within the network component; and
a modifying means for modifying a first class of service stored within the register to match a second class of service corresponding to the packet when the egress port is a subscriber port.

34. The system of claim 33, wherein the forwarding means forwards the packet appended with the customer identifier, the packet tag priority and the ether-type to an uplink port within the network component.

35. A system for processing a packet in a network component, said system comprising:
a first receiving means for receiving a packet in an ingress port at a network component, the packet comprising a first packet tag and a second packet tag;
a removing means for removing one of the first packet tag and the second packet tag from the packet;
a first obtaining means for obtaining a multicast index and a multicast type from indexing the packet tag to a look-up table;
an appending means for appending the packet with the multicast index and the multicast type;
a first modifying means for modifying an operational code of the packet to multicast when the multicast type is a first predetermined type;
a second modifying means for modifying the operation code of the packet to an IP multicast when the multicast type is a second predetermined type;
an assigning means for assigning a first class of service for the packet with a packet tag priority;
a modifying means for modifying a second class of service stored within a reciister to match the first class of service when an eciress port is a subscriber port; and
a first forwarding means for forwarding the packet to a first the egress port.

36. The system of claim 35, wherein the forwarding means forwards the packet to a gigabit port.

37. The system of claim 36, further comprising:
a second receiving means for receiving the packet at the gigabit port of a module within the network component;
a second obtaining means for obtaining an outgoing port bit map from a multicast look-up table based on the packet;
a third modifying means for modifying a second class of service stored within a register to match the first class of service, wherein the register corresponds to a subscriber port; and
a second forwarding means for forwarding the packet out of a second egress port.

* * * * *

UNITED STATES PATENT AND TRADEMARK OFFICE
CERTIFICATE OF CORRECTION

PATENT NO. : 7,539,185 B2  Page 1 of 1
APPLICATION NO. : 10/378937
DATED : May 26, 2009
INVENTOR(S) : Laxman Shankar et al.

It is certified that error appears in the above-identified patent and that said Letters Patent is hereby corrected as shown below:

Column 13, line 3, after, "egress port bit", add, --map--.
Column 14, line 1, after, "to a first", delete, "the".
Column 15, line 16, after, "at the second", insert, --buffer--.
Column 16, line 66, delete, "a nacket", and insert, --a packet--, and after, "and", delete, "p1".
Column 17, line 1, after, "within a", delete, "resister", and insert, --register--.
Column 18, line 43, after, "stored within a", delete, "reciister", and insert, --register--.
Column 18, line 44, after, "when an", delete, "eciress", and insert, --egress--.
Column 18, line 46, delete, "the".

Signed and Sealed this

Thirtieth Day of June, 2009

JOHN DOLL
*Acting Director of the United States Patent and Trademark Office*